US007002959B2

(12) United States Patent
Suzuki et al.

(10) Patent No.: US 7,002,959 B2
(45) Date of Patent: Feb. 21, 2006

(54) PACKET COMMUNICATION METHOD, NODE APPARATUS AND PACKET COMMUNICATION SYSTEM

(75) Inventors: Yoshifumi Suzuki, Yokosuka (JP); Takuya Shinozaki, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 722 days.

(21) Appl. No.: 09/741,894

(22) Filed: Dec. 22, 2000

(65) Prior Publication Data

US 2001/0014092 A1 Aug. 16, 2001

(30) Foreign Application Priority Data

Dec. 27, 1999 (JP) ................................ 11-371597

(51) Int. Cl.
*H04L 12/28* (2006.01)
*H04L 12/56* (2006.01)
*H04J 3/26* (2006.01)

(52) U.S. Cl. ...................................... 370/393; 370/475

(58) Field of Classification Search ................ 370/315, 370/328, 360, 384, 392, 396–397, 395.3–395.32, 370/395.52, 395.54, 400, 401, 409, 471, 370/475, 389, 393; 709/238, 242, 245, 249, 709/250

See application file for complete search history.

(56) References Cited

U.S. PATENT DOCUMENTS 5,159,592 A * 10/1992 Perkins ........................ 370/338
5,282,270 A * 1/1994 Oppenheimer et al. ..... 709/223
5,517,618 A * 5/1996 Wada et al. ................ 709/223
5,907,540 A * 5/1999 Hayashi ...................... 370/315
5,983,090 A * 11/1999 Aoki .......................... 455/403
5,996,021 A * 11/1999 Civanlar et al. ............ 709/238
6,097,703 A * 8/2000 Larsen et al. .............. 370/254
6,188,675 B1 * 2/2001 Casper et al. ............... 370/254
6,654,359 B1 * 11/2003 La Porta et al. ............ 370/328
6,680,942 B1 * 1/2004 Mead et al. ................ 370/392
6,765,920 B1 * 7/2004 Tari et al. .................... 370/401
6,914,906 B1 * 7/2005 Mullens et al. ............. 370/397
2004/0202166 A1 * 10/2004 Dillon ........................ 370/392

FOREIGN PATENT DOCUMENTS

EP 0 578 041 1/1994

OTHER PUBLICATIONS

C. E. Perkins, et al., IEEE Communications Magazine, vol. 35, No. 5, XP-000657114, pp. 84-86, 91-99, "Mobile IP", 1997.

(Continued)

*Primary Examiner*—Hassan Kizou
*Assistant Examiner*—Gregory B. Sefcheck
(74) *Attorney, Agent, or Firm*—Oblon, Spivak, McClelland, Maier & Neustadt, P.C.

(57) ABSTRACT

A packet communication method of performing communication employing a packet having a transmission-source address and destination address, comprises the steps of: making a predetermined number of bits of the transmission-source address and a predetermined number of bits of destination address be fixed addresses; a repeating node for repeating a packet from a transmission-source terminal first converting the fixed address of the transmission-source address of the received packet into an address of an higher-rank station of the repeating node; and the repeating address converting the fixed address of the destination address of the received packet into an address of an higher-rank station of a last repeating node for a destination terminal, and transferring the packet.

30 Claims, 21 Drawing Sheets

OTHER PUBLICATIONS

C. Perkins, http://www.ietf.org/rfc/rfc2004, XP-002137013, pp. 1-6, "Minimal Encapsulation Within IP", Oct. 1996.

A. G. Valko, Computer Communications Review, Association for Computing Machinery, vol. 29, No. 1, XP-000823873, pp. 50-65 "Cellular IP: A New Approach to Internet Host Mobility", Jan. 1999.

R. Ramjee, et al., IEEE, XP-010356967, pp. 283-292, "Hawaii: A Domain-Based Approach for Supporting Mobility in Wide-Area Wireless Networks", Oct. 31, 1999.

D. Cohen, et al., IEEE, Proceedings of the Conference on Computer Communications (INFOCOM), vol. 2, conf. 11, XP-010062192, pp. 626-632, "IP Addressing and Routing in a Local Wireless Network", May 4-8, 1992.

* cited by examiner

PACKET COMMUNICATION METHOD, NODE APPARATUS AND PACKET COMMUNICATION SYSTEM

BACKGROUND OF THE INVENTION

1. Field of the Invention

The present invention relates to a packet communication method, a node apparatus and a packet communication system.

2. Description of the Related Art

In the related art, an IP address is fixed for each host, and cannot adapt to a movement of the host. If an address is given for each movement of the host, the IP address is frequently changed, and, thereby, a traffic increases. Further, if the IP address is frequently changed, a case where the address of a mobile terminal cannot be obtained may occur, thereby other terminal cannot recognize the change in IP address, and cannot perform communication therewith.

In order to solve such a problem, it can be considered that a packet is changed into a capsule using a new address each time a host moves.

However, when a movement of host is made frequently, a load of a home station or the like increases because a time is required for changing the packet into a capsule and returning the capsule into the original packet.

Further, when an address of the other end of transmission is not known at a time of starting communication, it is necessary to transmit and receive a packet for inquiring the destination address. In such a case, a large time is required for transmitting the initial packet to the other end.

Furthermore, when a movement of a host is made frequently, packets for control generated together with address change increase, and, thereby, the traffic of information packets is suppressed.

SUMMARY OF THE INVENTION

The present invention has been devised in consideration of the above-mentioned problems, and, an object of the present invention is to provide a packet communication method by which, even when a repeating node is switched during communication, it is not necessary for a host to change an IP address, and it is possible to continue the communication only by path control or routing control.

A packet communication method of communication employing a packet having a transmission-source address and destination address, according to the present invention, comprises the steps of:

a) making a predetermined number of bits of the transmission-source address and a predetermined number of bits of destination address be fixed addresses (for example, FIXED (N00), in FIG. 2);

b) a repeating node (for example, a mobile station 40, shown in FIG. 3), which repeats a packet from a transmission-source terminal (for example, a host computer 30, shown in FIG. 3) first, converting the fixed address of the transmission-source address of the received packet into an address (for example, B01, shown in FIG. 3) of a higher-rank station (for example, a base station 50, shown in FIG. 3) of the above-mentioned repeating node; and c) the above-mentioned repeating node converting the fixed address of the destination address of the received packet into an address (for example, B02, shown in FIG. 3) of a higher-rank station (for example, a base station 51, shown in FIG. 3) of a last repeating node (for example, a mobile station 41, shown in FIG. 3) for a destination terminal (for example, a host computer 31, shown in FIG. 3), and transferring the packet.

The repeating node, which repeats the packet from the transmission-source terminal first, may convert the fixed address of the transmission-source address of the received packet into an address (for example, A01, shown in FIG. 3) of a node (for example, an address management server 22, shown in FIG. 3) having a table of an address of a higher-rank station of a last repeating node for each terminal, when the address of the higher-rank station of the last repeating node for the destination terminal is not known, and transfers the packet.

The node having the table of the address of the higher-rank station of the last repeating node for each terminal may convert the own address in the destination address of the received packet into the address of the higher-rank station of the last repeating node for the destination terminal, and transfer the packet.

The higher-rank station of the repeating node, which repeats the packet from the transmission-source terminal first, may transfer the received packet without changing the transmission-source address, when the address of the higher-rank station in the transmission-source address of the received packet coincides with the address of the own station, and convert the address of the higher-rank station in the transmission-source address of the received packet into the address of the own station, when the address of the higher-rank station in the transmission-source address of the received packet does not coincide with the address of the own station, and transfer the packet.

The higher-rank station of the repeating node, which repeats the packet from the transmission-source terminal first, may further instruct the higher-rank station having the transmission-source address written in the received packet to transfer a packet addressed to the above-mentioned transmission-source terminal to the own station, when the address of the higher-rank station in the transmission-source address of the received packet does not coincide with the address of the own station, and further instruct the node having the table of the address of the higher-rank station of the last repeating node for each terminal to update the table.

The higher-rank station of the last repeating node for the destination terminal may transfer the received packet without changing the destination address when the address of the higher-rank station in the destination address of the received packet coincides with the address of the own station and no transfer instructions are given for the destination terminal, and convert the address of the higher-rank station of the destination address of the received packet into an address of a higher-rank station of the destination of the thus-instructed transfer, when the address of the higher-rank station in the destination address of the received packet coincides with the address of the own station and transfer instructions are given for the destination terminal, and transfer the packet.

The higher-rank station of the last repeating node for the destination terminal may transfer the packet, when the address of the higher-rank station in the destination address of the received packet does not coincide with the address of the own station.

The higher-rank station of the last repeating node for the destination terminal may convert the addresses of the higher-rank stations in the transmission-source address and destination address of the received packet into the fixed addresses, and transfer the packet to the destination terminal.

In a case where the destination terminal belongs to another network (for example, an external IP network 130, shown in FIG. 7), the transmission-source terminal may transmit the packet having an address given to the destination terminal as the destination address thereof;

the repeating node, which repeats the packet from the transmission-source terminal first, may convert the fixed address in the transmission-source address of the received packet into the address of the higher-rank station of the repeating node, and transfer the packet to a gateway station (for example, a gateway station 21, shown in FIG. 7) which provides an interface with the other network; and the gateway station may convert the address of the higher-rank station of the received packet into the fixed address, and transfer the packet into the other network.

In a case where the transmission-source terminal belongs to another network (for example, an external IP network 130, shown in FIG. 8), the transmission-source terminal may transmit a packet having an address given to the destination terminal as the destination address thereof; and a gateway station (for example, a gateway station 21, shown in FIG. 8) which provides an interface with the other network may convert the fixed address in the destination address of the received packet into the address of the higher-rank station of the last repeating node for the destination terminal, and transfer the packet.

According to the present invention, it is possible to perform movement control of a mobile station only by path control or routing control in a base station network.

Further, even when a base station to which a terminal belongs is switched due to a movement or change in radio propagation condition, a traffic of path-control or routing-control information in a base station network does not increase.

Furthermore, it is possible to prevent a packet from being discarded due to destination of transfer being unknown due to a movement of a mobile station.

Further, an address of a mobile host is not changed even at a receiving side.

Further, even when a mobile station changes a base station to which the mobile station belongs during communication, it is not necessary to specially transmit a control packet for reporting the change of the base station to which the mobile station belongs.

Further, even when a repeating node is changed during communication, it is possible to continue the communication only by path control or routing control without changing an IP address at a host.

Other objects and further features of the present invention will become more apparent from the following detailed description when read in conjunction with the accompanying drawings.

DETAILED DESCRIPTION OF THE PREFERRED EMBODIMENT

An embodiment of the present invention will now be described with reference to figures.

The description will be made for an example of a packet mobile radio communication system.

Figure 1:
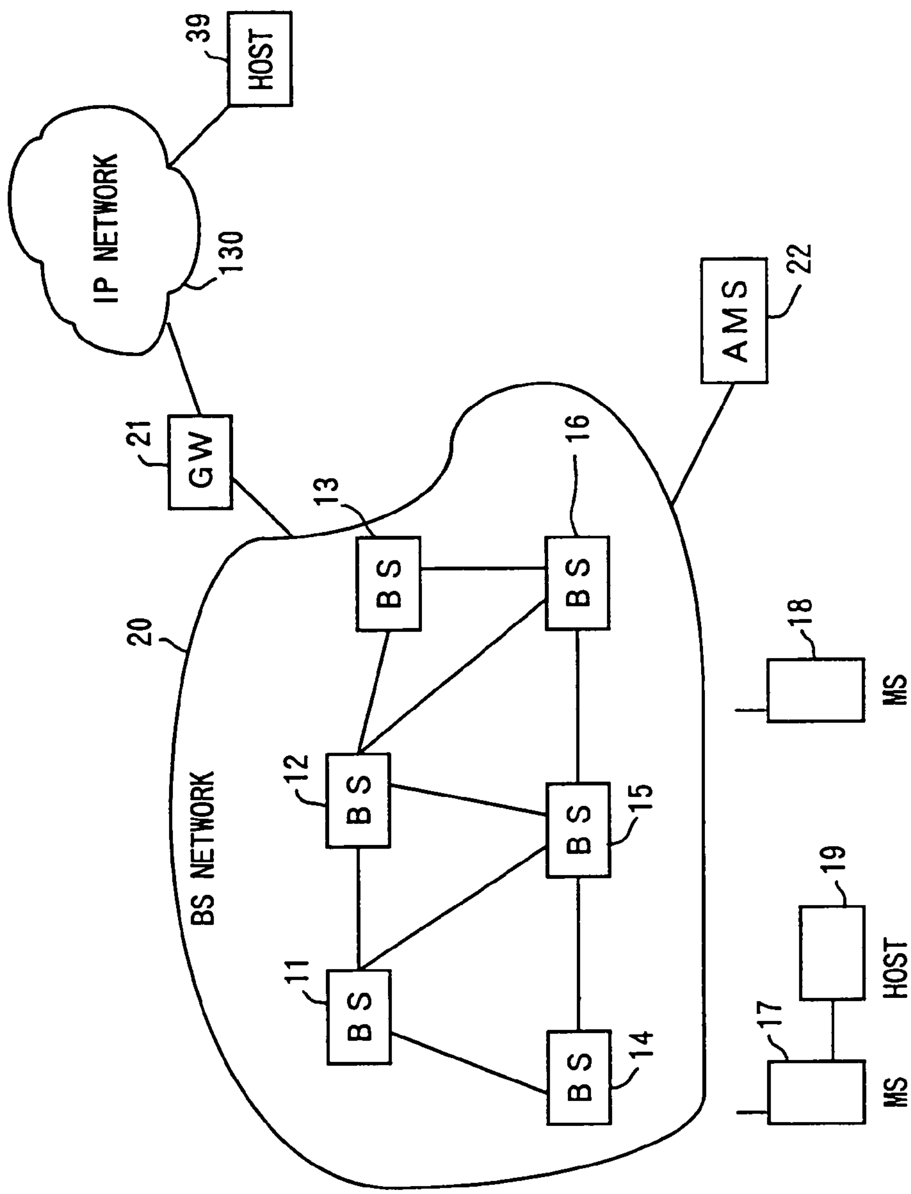
FIG. 1 illustrates a packet mobile radio communication system.

The packet mobile radio communication system in the example has a configuration shown in FIG. 1.

As shown in FIG. 1, the packet mobile communication system includes a mobile station (MS) 17, another mobile station 18, a terminal (HOST: host computer) 19, a base station network (BS network) 20, a gateway station (GW) 21 for providing an interface with another network, an address management server (AMS) 22, the IP network 130, and another terminal (HOST: host computer) 39 of the IP network 130. The base station network 20 includes, for example, base stations (BS) 11 through 16.

One or a plurality of terminals (host computers: host) are connected to one mobile station. The address management server (AMS) 22 manages the number (host ID) special to each host and the number (base station ID) special to a base station to which a mobile station to which the host is connected belongs. The address management server 22 has an address management table which is a table of each host ID and the base station ID of the base station to which the host is connected via the mobile station. Further, the gateway station 21 provides an interface with another network (the IP network 130), and has an address management table, same as the address management server 22.

Figure 2:
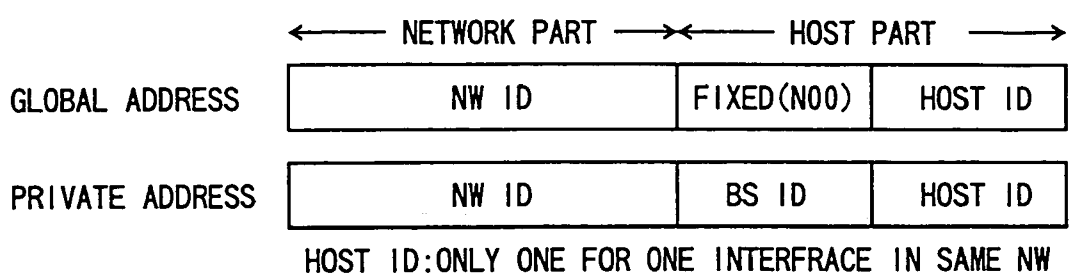
FIG. 2 illustrates a configuration of an address of a packet according to the present invention.

FIG. 2 shows a configuration of an address according to the present invention.

The address includes a network part and a host part. The network part is an address special to a network.

The address of the host part is a combination of an address (host ID) special to the host and an certain fixed address (FIXED: N00). In a mobile station, the part of the fixed address is replaced by a base station ID of the base station to which the mobile station belongs (base station ID field).

In description of the embodiment of the present invention which will now be described, each mobile host belonging to a communication network is registered to the address management server at a time of starting up of the mobile station or at a time of releasing from a sleep state, and, at a time of starting communication, a host of transmission source knows the ID of the base station to which the host belongs. Further, in the address management server, the correspondences in ID between the mobile hosts belonging to the communication network and the base stations to which the hosts belong are updated into the latest ones.

1. First, a case where a destination host is included in the same communication network will now be described.

(1) At a time of starting communication

Figure 3:
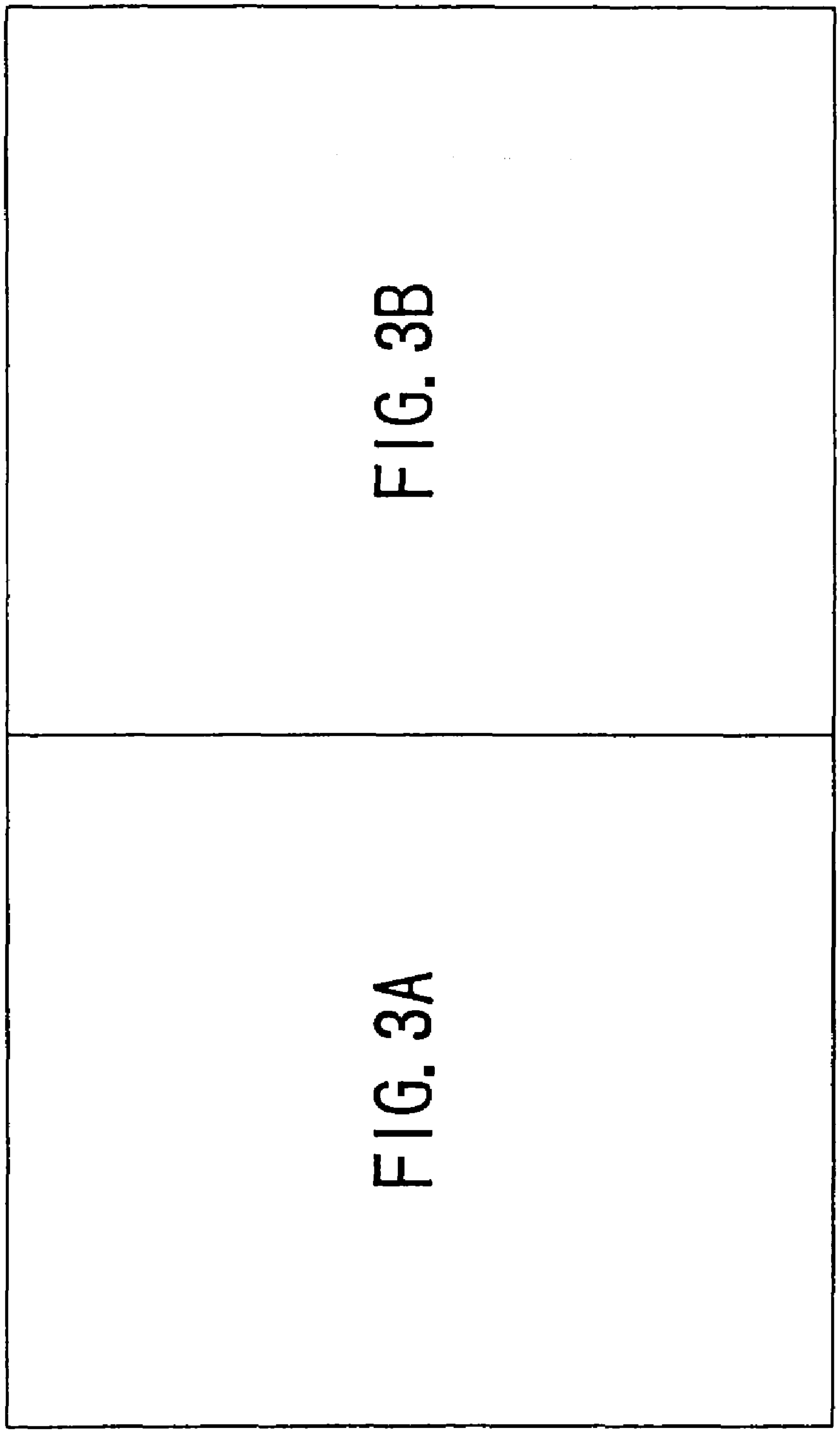
FIG. 3 illustrates a communication procedure at a time of starting communication.
Figure 3A:
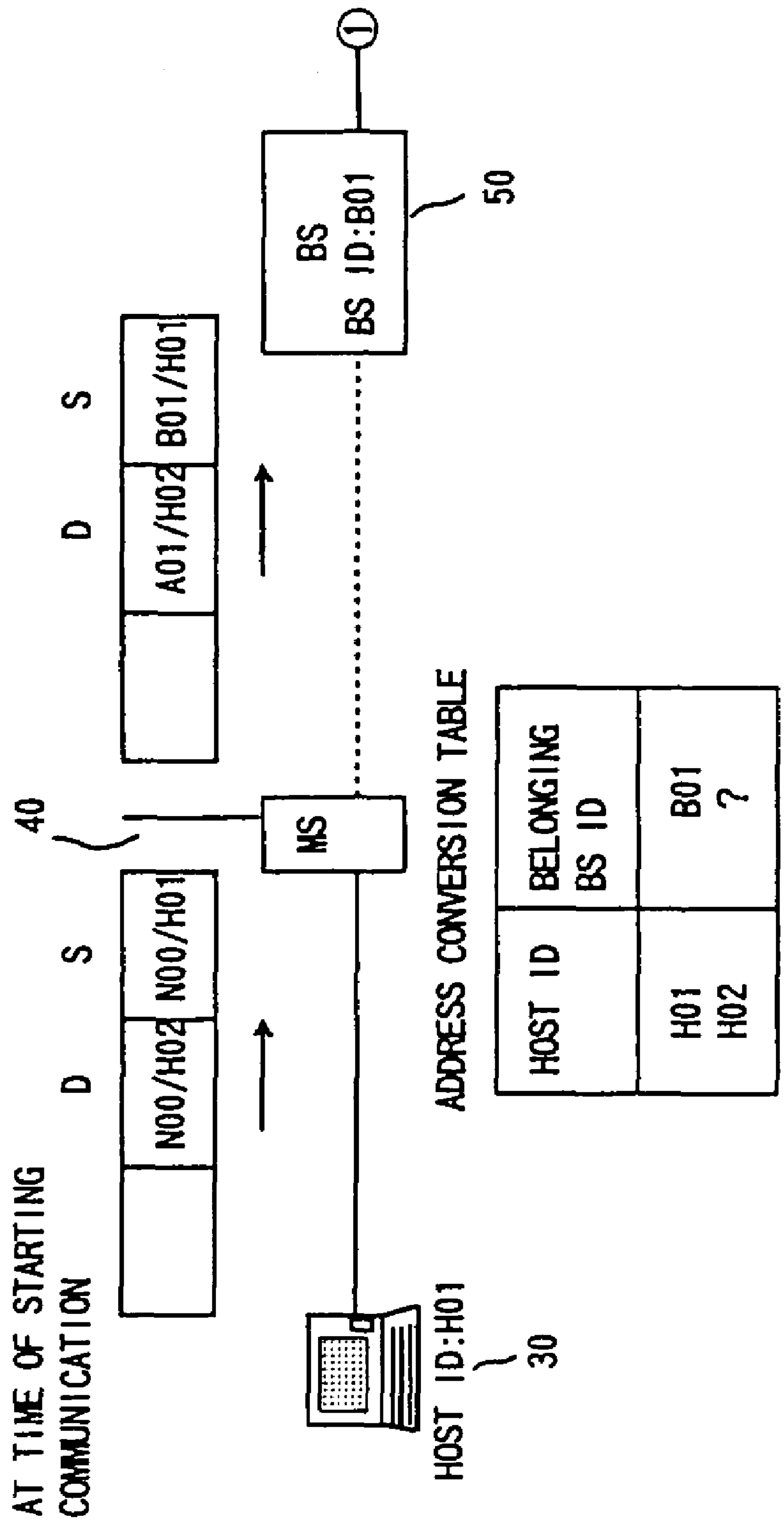
Figure 3B:
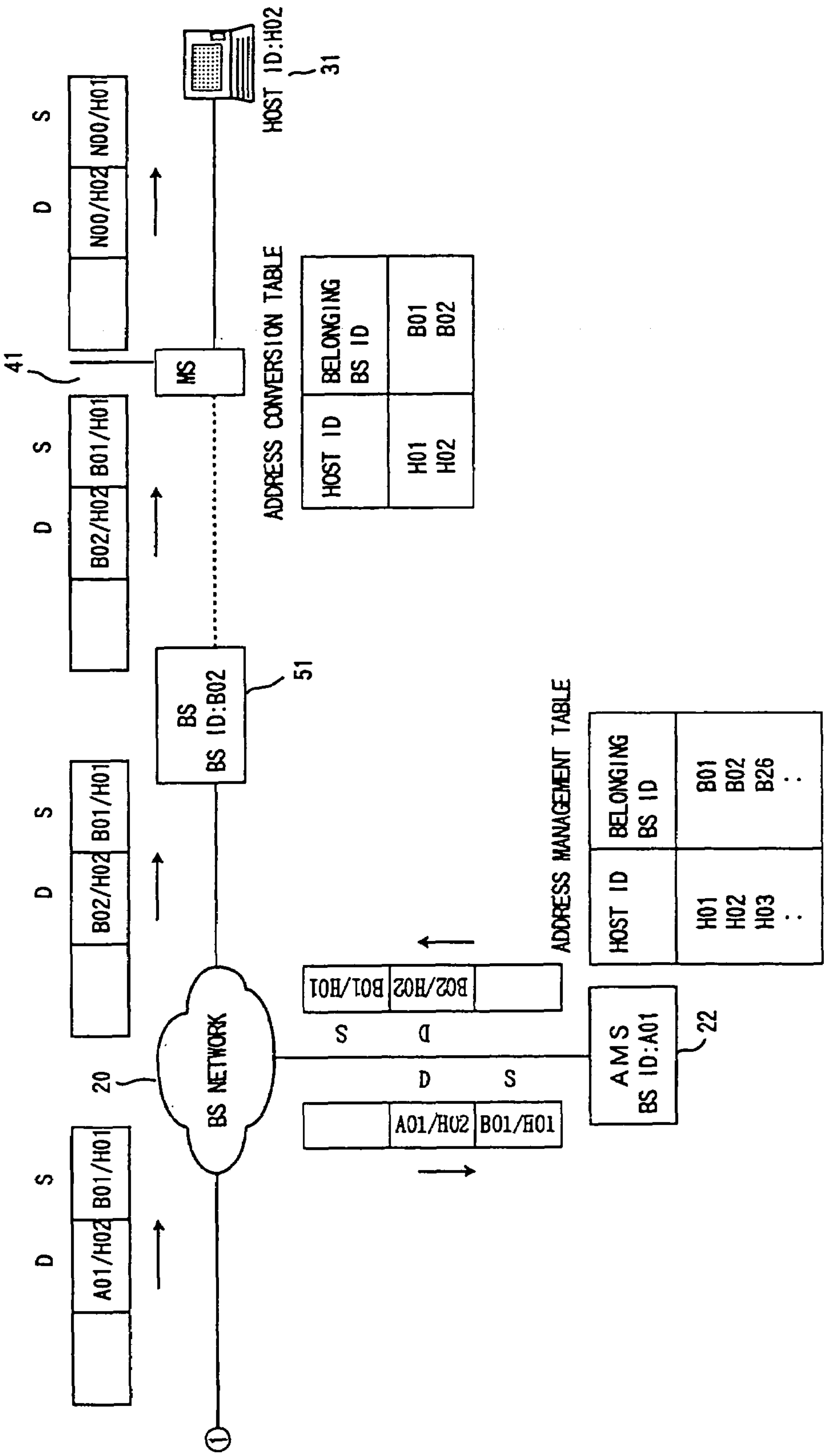

A communication procedure at a time of starting communication will now be described with reference to FIG. 3.

A case will now be described where a packet is transmitted from a host 30 having a host ID of H01 connected to a mobile station 40 belonging to a base station 50 having a base station ID of B01 to a host 31 having a host ID of H02 connected to a mobile station 41 belonging to a base station 51 having a base station ID of B02.

① A packet having the transmission-source address and the destination address of N00/H01 and N00/H02 is transmitted from the host 30.

② The mobile station 40 replaces the base station ID field of the transmission-source address with the address B01 of the base station 50 to which the mobile station 40 belongs. Because the ID of the base station 51 to which the host 31 of the destination belongs is not known, the mobile station 40 replaces the base station ID field with A01 which is the ID of the address management server 22. Then, the mobile station 40 transfers the thus-obtained packet into the base station network 20.

③ In the base station network 20, the packet is transferred to the address management server 22 having the address A01 which is the destination node of the packet. The address management server 22 refers to the address management table, and replaces the base station ID field of the destination address with B02 which is the address of the base station 51 to which the host 31 belongs. Then, the address management server 22 transfers the thus-obtained packet into the base station network 20.

④ The mobile station 41 receives the packet transferred by the address management server 22 via the destination base station 51 (B02). Further, the mobile station 41 knows from the transmission-source address of the received packet that the base station ID of the base station to which the host 30 (H01) belongs is B01. Then, the mobile station 41 stores it in an address conversion table of the own station.

⑤ Further, the mobile station 41 replaces the base station ID field of each of the transmission-source address and destination address with N00, and transmits the thus-obtained packet to the host 31 (H02).

Thereby, according to the present invention, it is possible to transfer the packet from the management server without executing processes of inquiring the address of a host of the other end and receiving the answer thereto.

(2) Normal Communication

A communication procedure of normal communication will now be described with reference to FIG. 4.

A case will now be described where a packet is transmitted from the host 30 having the host ID of H01 connected to the mobile station 40 belonging to the base station 50 having the base station ID of B01 to the host 31 having the host ID of H02 connected to the mobile station 41 belonging to the base station 51 having the base station ID of B02.

① A packet having the transmission-source address and the destination address of N00/H01 and N00/H02 is transmitted from the host 30.

Figure 4:
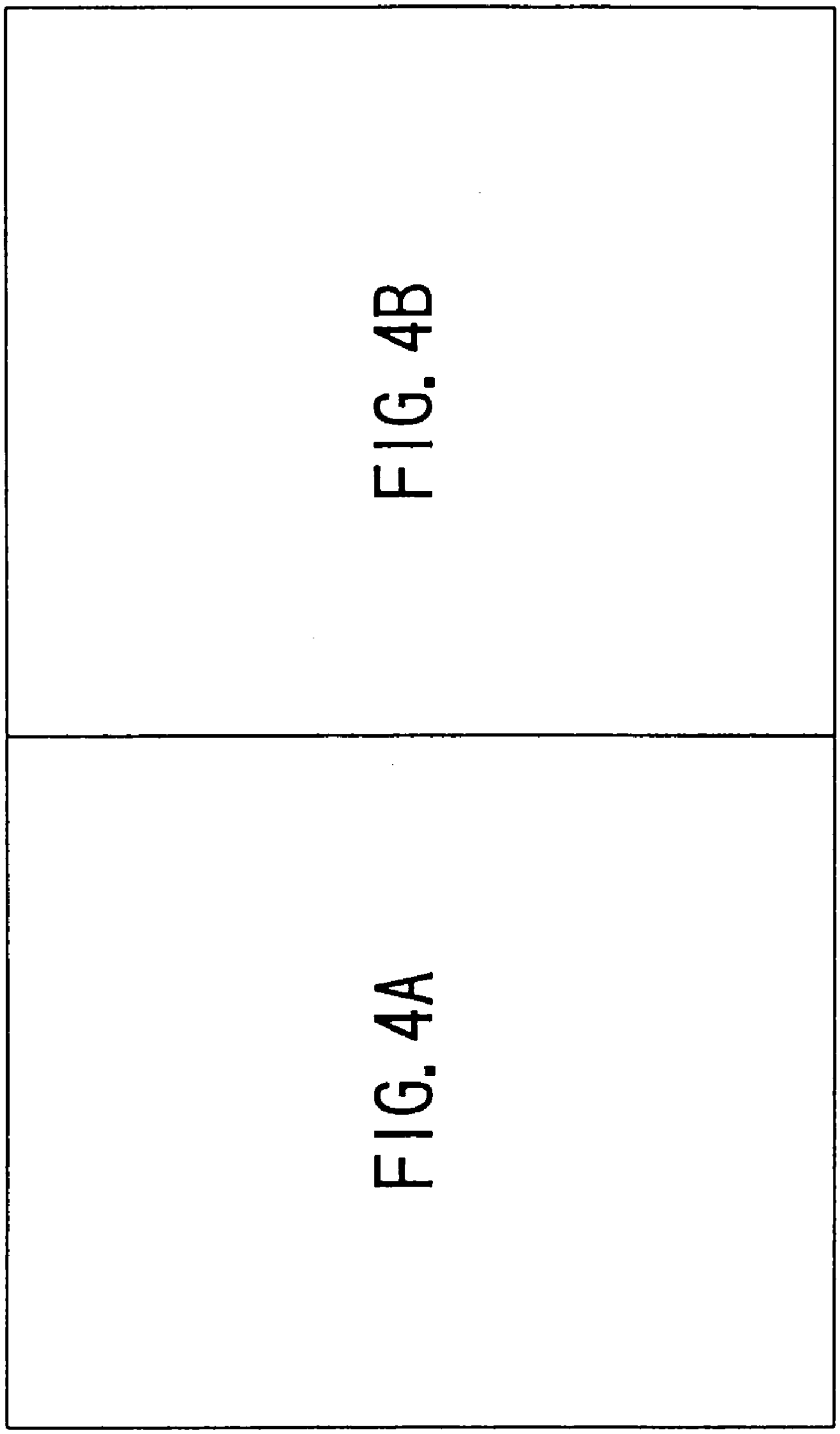
FIG. 4 illustrates a communication procedure of normal communication.
Figure 4A:
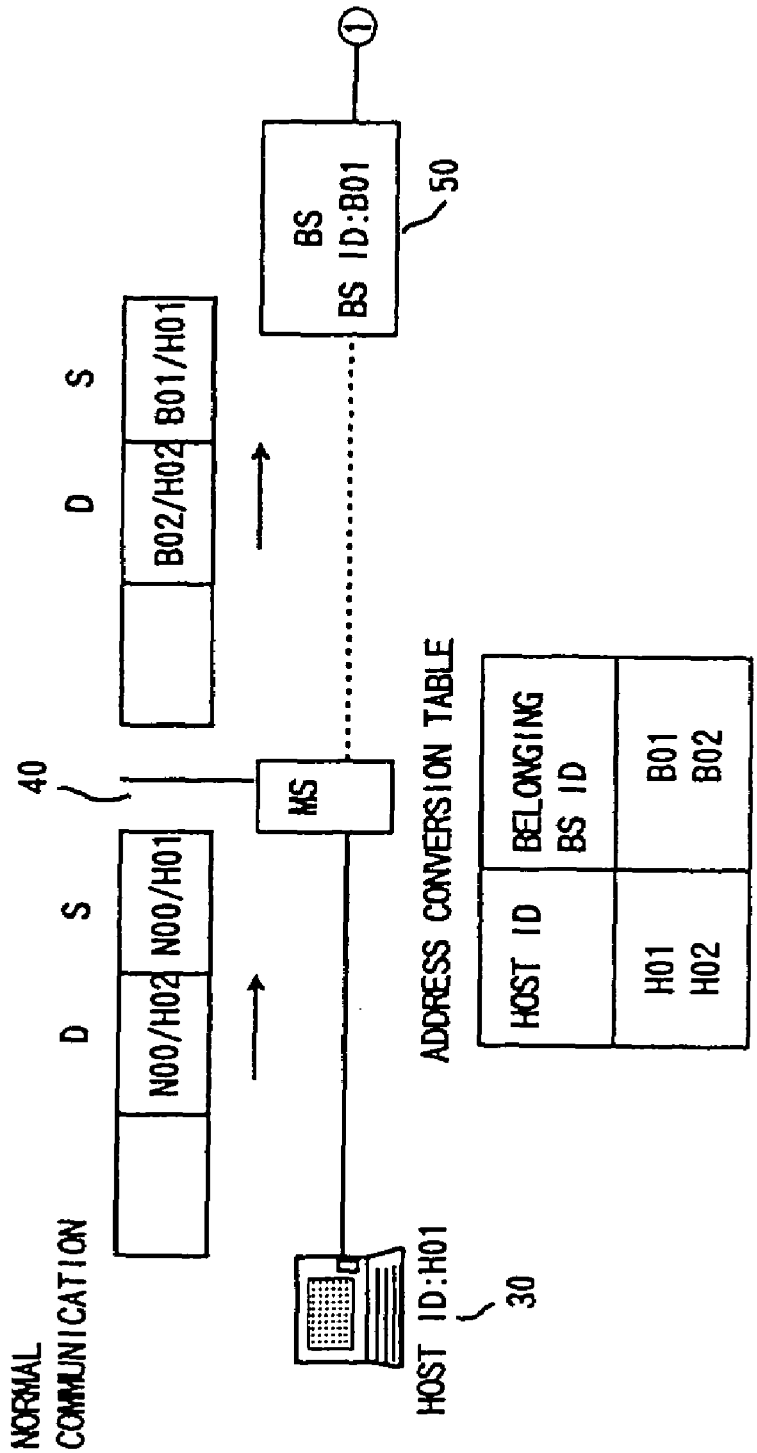
Figure 4B:
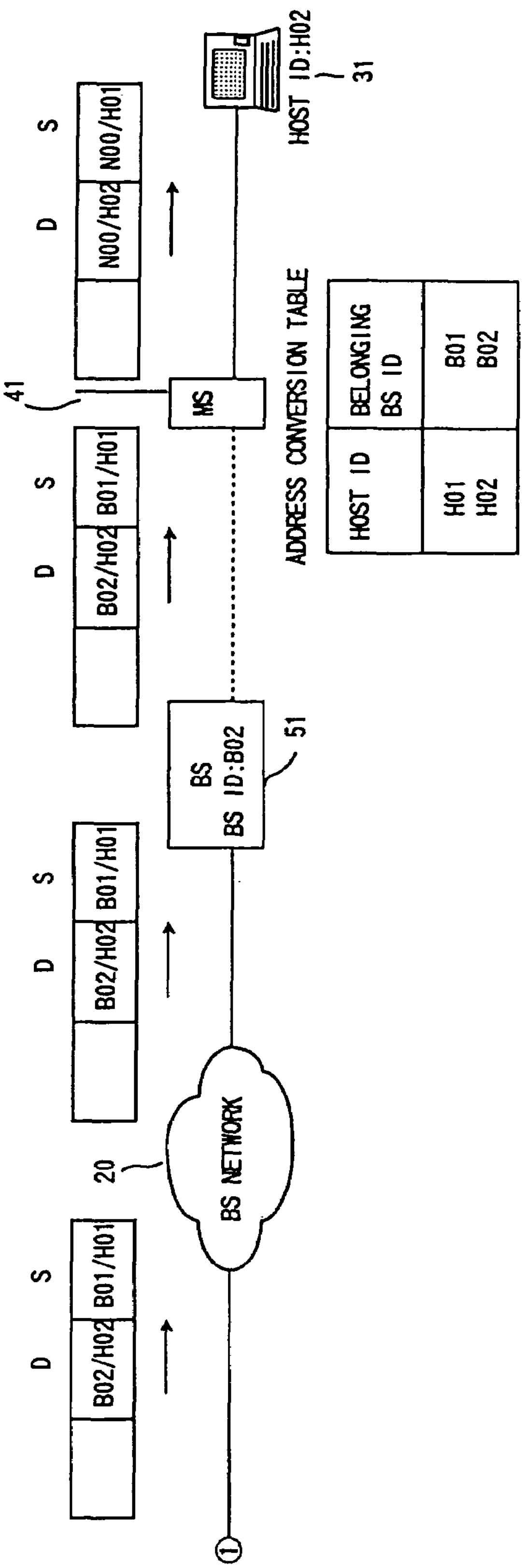

② (In this case, it is assumed that a process such as that described above in the item (1) has been performed from the host 31 to the host 30 so that the address conversion table of the mobile station 40 has the base station ID B02 of the base station 51 to which the host 31 belongs, as shown in FIG. 4.) According to the address conversion table, the mobile station 40 replaces the base station ID field of the transmission-source address with the address B01 of the base station 50 to which the mobile station 40 belongs. On the other hand, the mobile station 40 replaces the base station ID field of the destination address by B02 which is ID of the base station 51 to which the destination host 31 belongs. Then, the mobile station 40 transfers the thus-obtained packet into the base station network 20.

③ The packet is transferred to the mobile station 41 which belongs to the base station 51 (B02) via the base station 51 of destination. Then, the mobile station 41 replaces the base station ID field of each of the transmission-source address and destination address with N00, and transfers the packet to the host 31 (H02).

Figure 5:
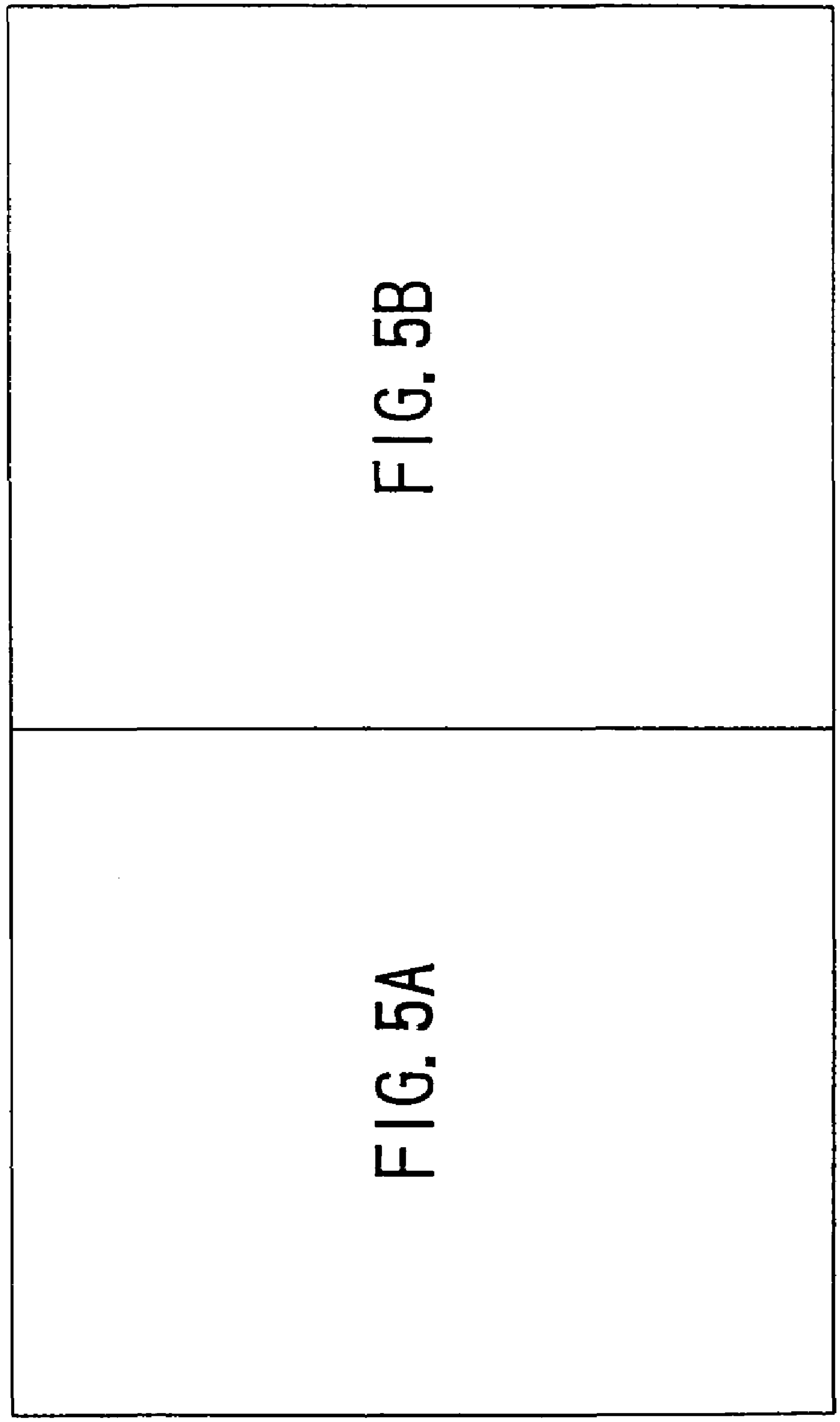
FIG. 5 illustrates a communication procedure in a case where a base station to which a transmission-source host belongs is switched to another base station.
Figure 5A:
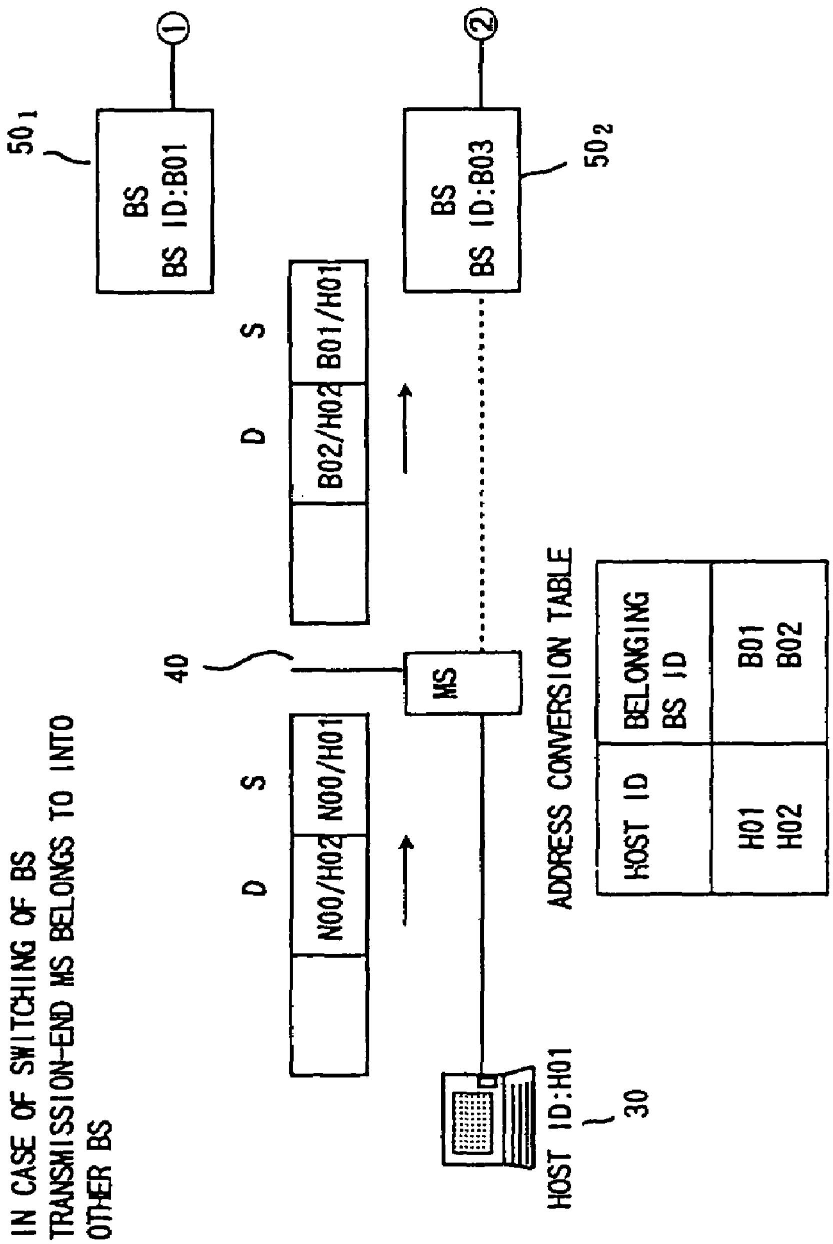
Figure 5B:
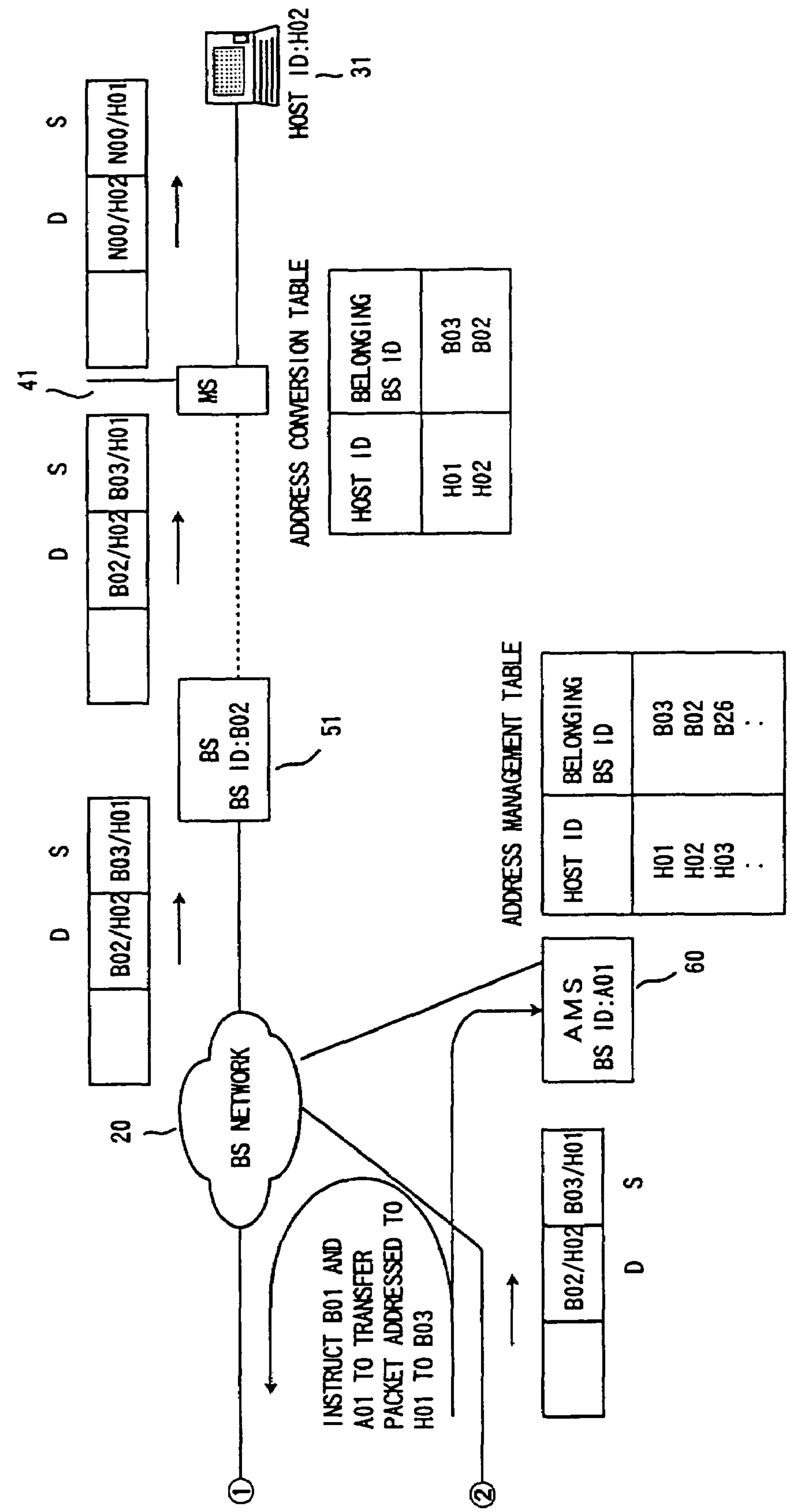

(3) A case where a base station to which a transmission-source host belongs is switched to another base station With reference to FIG. 5, a communication procedure in a case where a base station to which a transmission-source host belongs is switched to another base station will now be described.

A case where, during a process of transmitting a packet from the host 30 having the host ID of H01 connected to the mobile station 40 belonging to the base station $\mathbf{50}_1$ having the base station ID of B01 to the host 31 having the host ID of H02 connected to the mobile station 41 belonging to the base station 51 having the base station ID of B02, the base station to which the host 30 (H01) belongs is switched into a base station $\mathbf{50}_2$ (B03) will now be described.

① The mobile station 40, when converting the addresses, replaces the base station ID field of the transmission-source address with B01 which is the address of the original base station $\mathbf{50}_1$, and transmits the packet to the base station $\mathbf{50}_2$ (B03).

② The base station $\mathbf{50}_2$ (B03), receiving the packet, (i) replaces the base station ID field of the transmission-source address by B03 which is the address of its own, and transmits the packet to the base station network 20; and (ii) knows from the original contents of the base station ID field of the transmission-source address that the address of the base station $\mathbf{50}_1$ to which the host 30 originally belongs is B01 and transmits, to the base station $\mathbf{50}_1$, a packet instructing the base station $\mathbf{50}_1$ to transfer a transferred packet addressed to the host 30 (H01) to the base station $\mathbf{50}_2$ (B03). At the same time, also to the address management server 22, the base station $\mathbf{50}_2$ (B03) transmits a packet instructing the address management server 22 to update the base station to which the host 30 (H01) belongs into B03.

④ After that, the process same as that in the case of normal communication is executed.

Figure 6:
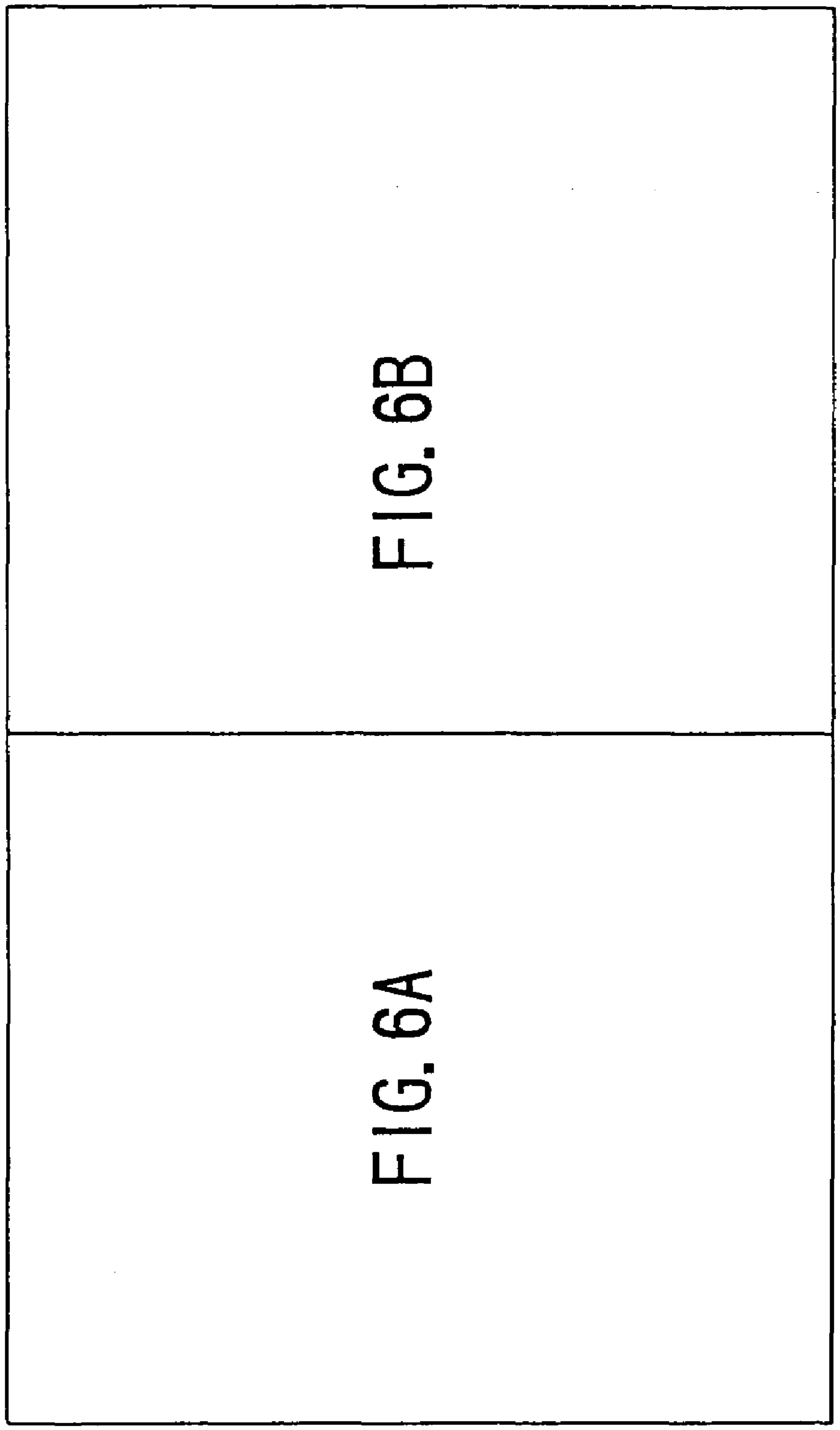
FIG. 6 illustrates a communication procedure in a case where a base station to which a destination host belongs is switched to another base station.
Figure 6A:
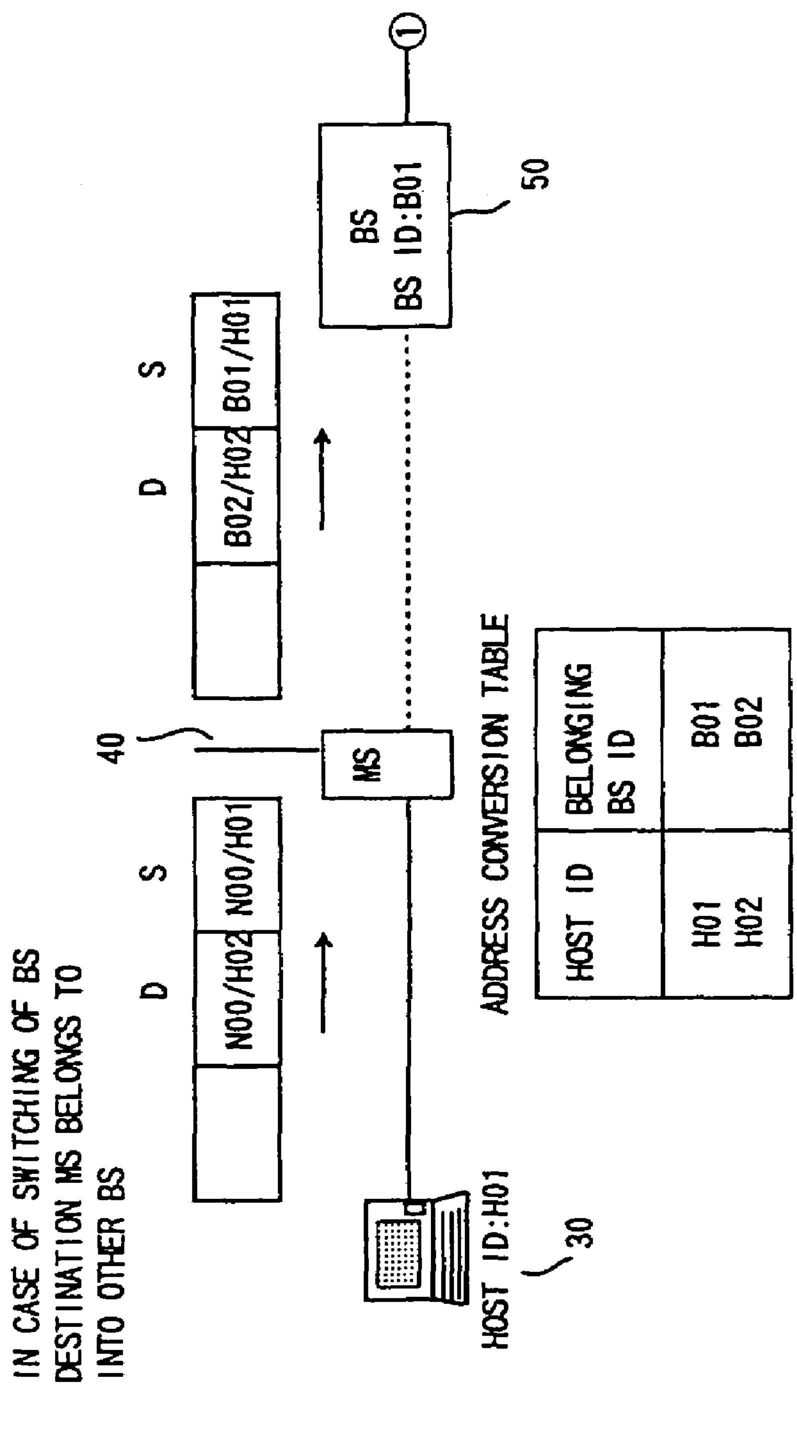
Figure 6B:
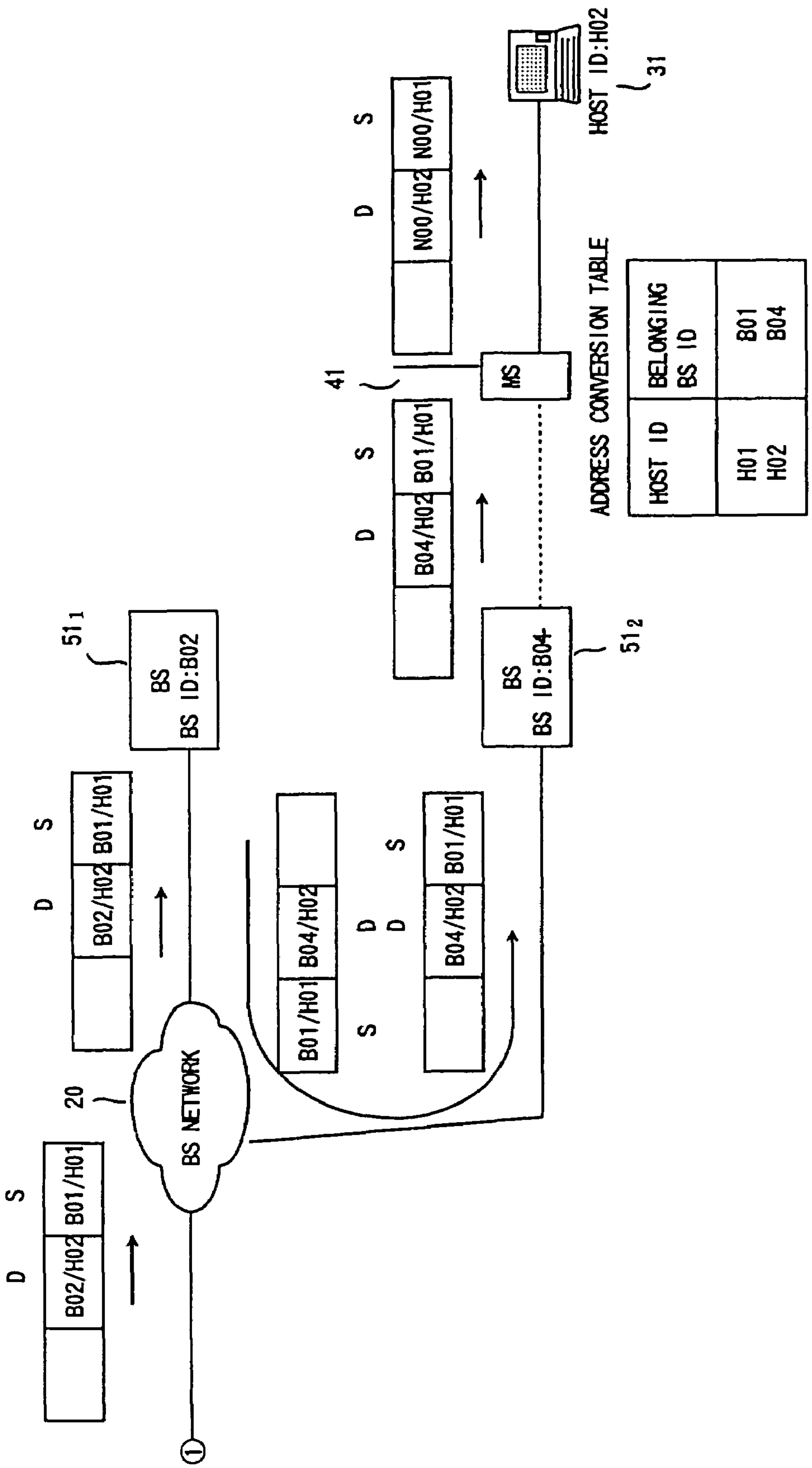

(4) A case where a base station to which a destination host belongs is switched to another base station With reference to FIG. 6, a communication procedure in a case where a base station to which a destination host belongs is switched to another base station will now be described.

A case where, during a process of transmitting a packet from the host 30 having the host ID of H01 connected to the mobile station 40 belonging to the base station 50 having the base station ID of B01 to the host 31 having the host ID of H02 connected to the mobile station 41 belonging to the base station $\mathbf{51}_1$ having the base station ID of B02, the base station to which the host 31 (H02) belongs is switched into a base station $\mathbf{51}_2$ (B04) will now be described.

① In the manner same as that in the normal communication, the packet is transferred to the base station $\mathbf{51}_1$ (B02) via the base station network 20.

② The base station $\mathbf{50}_1$ (B02) previously receives instructions to transfer a packet addressed to the host 31 (H02) to the base station $\mathbf{51}_2$ (B04) when receiving the packet addressed to the host 31 (H02), when the base station to which the host 31 (H02) belongs is switched to the base station $51_2$ (B04), then replaces the base station ID field of the destination address of the received packet with B04, and transfers the packet to the base station network 20.

③ After that, the process same as that in the normal communication is executed.

Figure 7:
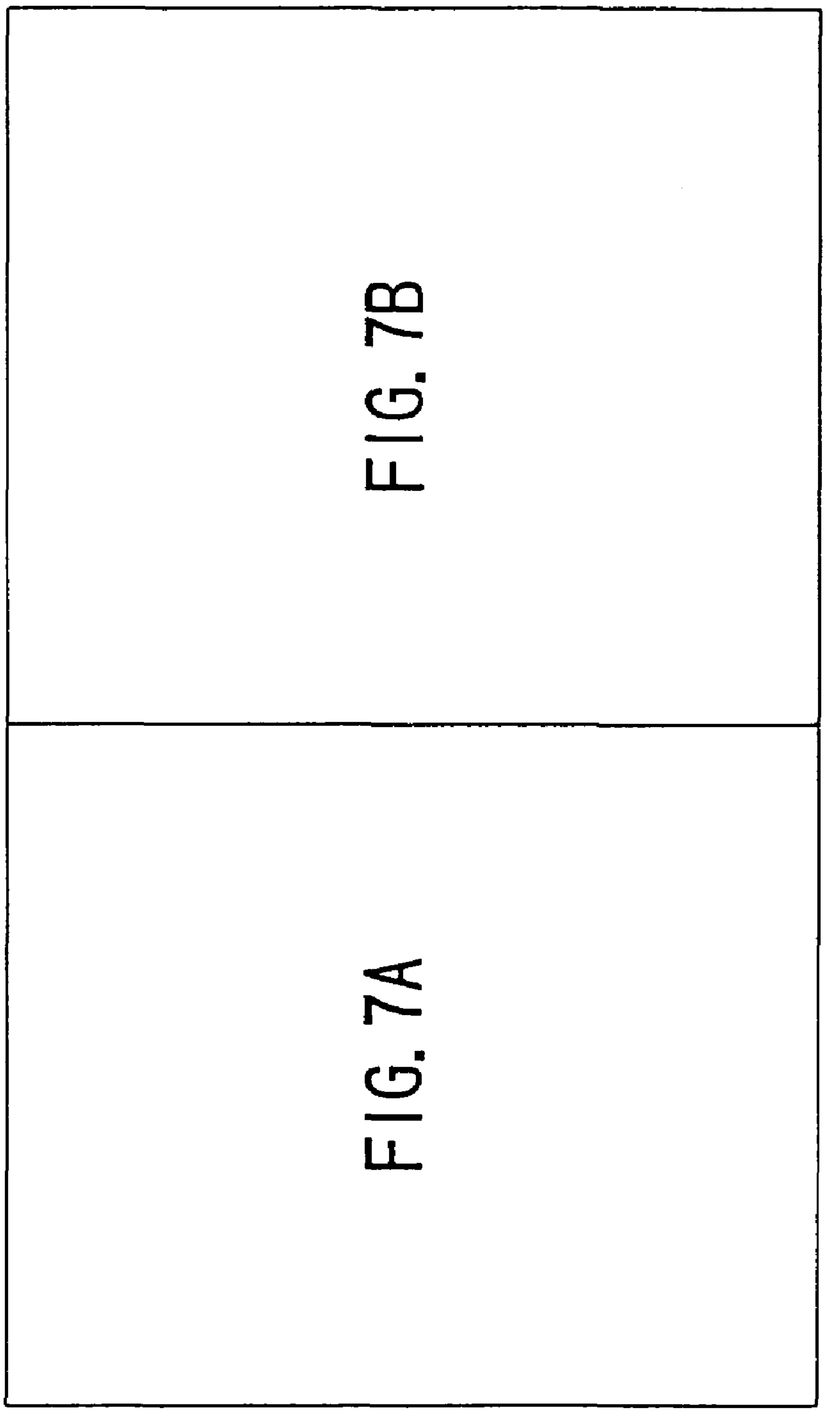
FIG. 7 illustrates a communication procedure in a case where a destination of transmission is in an external IP network.
Figure 7A:
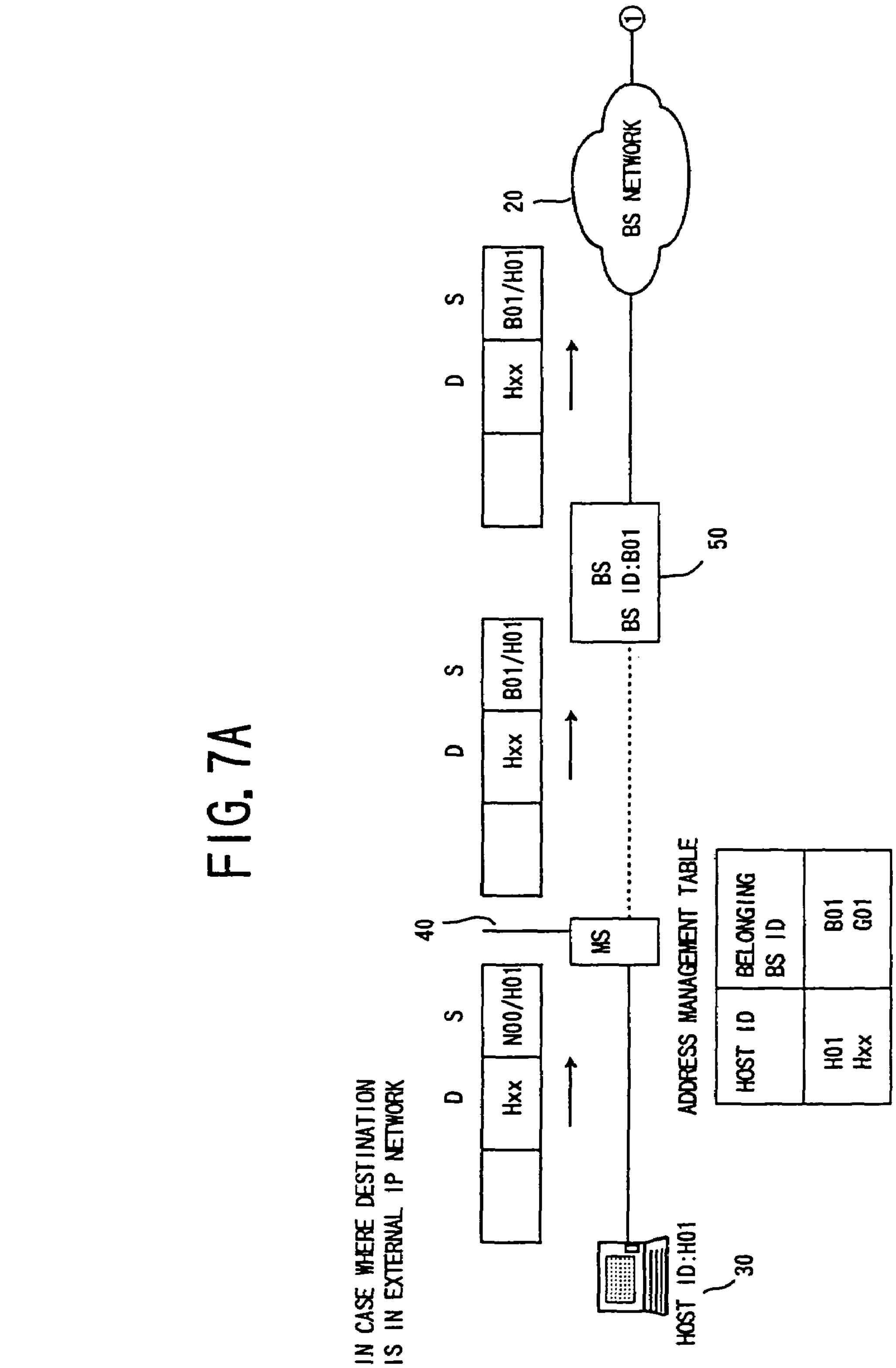
Figure 7B:
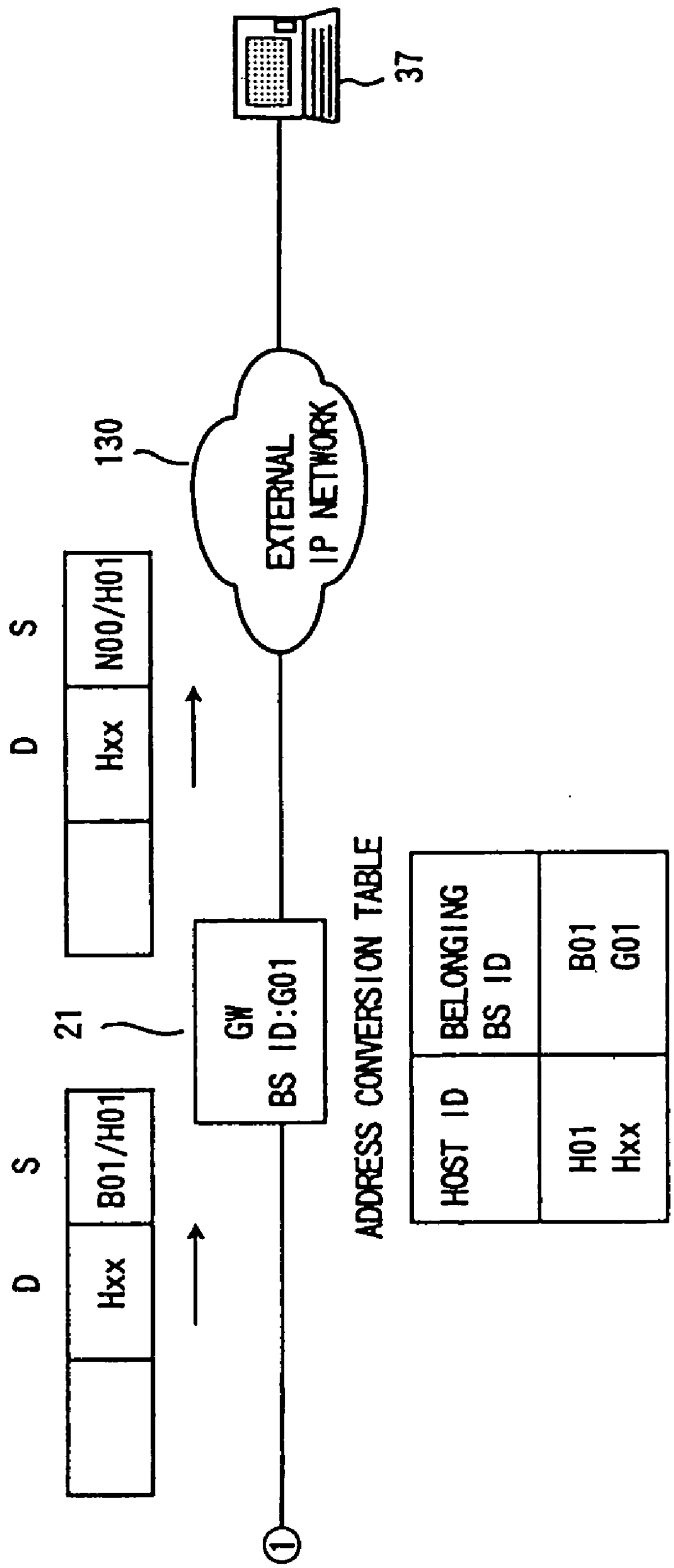

2. A case where a host on the other end of transmission is in an external IP network (1) A case where a packet is transmitted from the host 30 having the host ID of H01 connected to the mobile station 40 belonging to the base station 50 having the base station ID of B01 to a host 37 in an external IP network 130 will now be described with reference to FIG. 7.

① A packet having the transmission-source address and destination address of N00/H01 and Hxx is transmitted from the host 30.

② The mobile station 40 first replaces the base station ID field of the transmission-source address with the address B01 to which the mobile station 40 belongs. On the other hand, when the destination host 37 is in the external IP network 130, the mobile station 40 does not change the destination address, and transmits the packet into the base station network 20.

③ In the base station network 20, when the destination of the packet is in the external IP network 130, the packet is transferred to the gateway station 21.

④ The gateway station 21 replaces the base station ID field of the transmission-source address by the fixed address N00, and transmits the packet into the external IP network 130.

Figure 8:
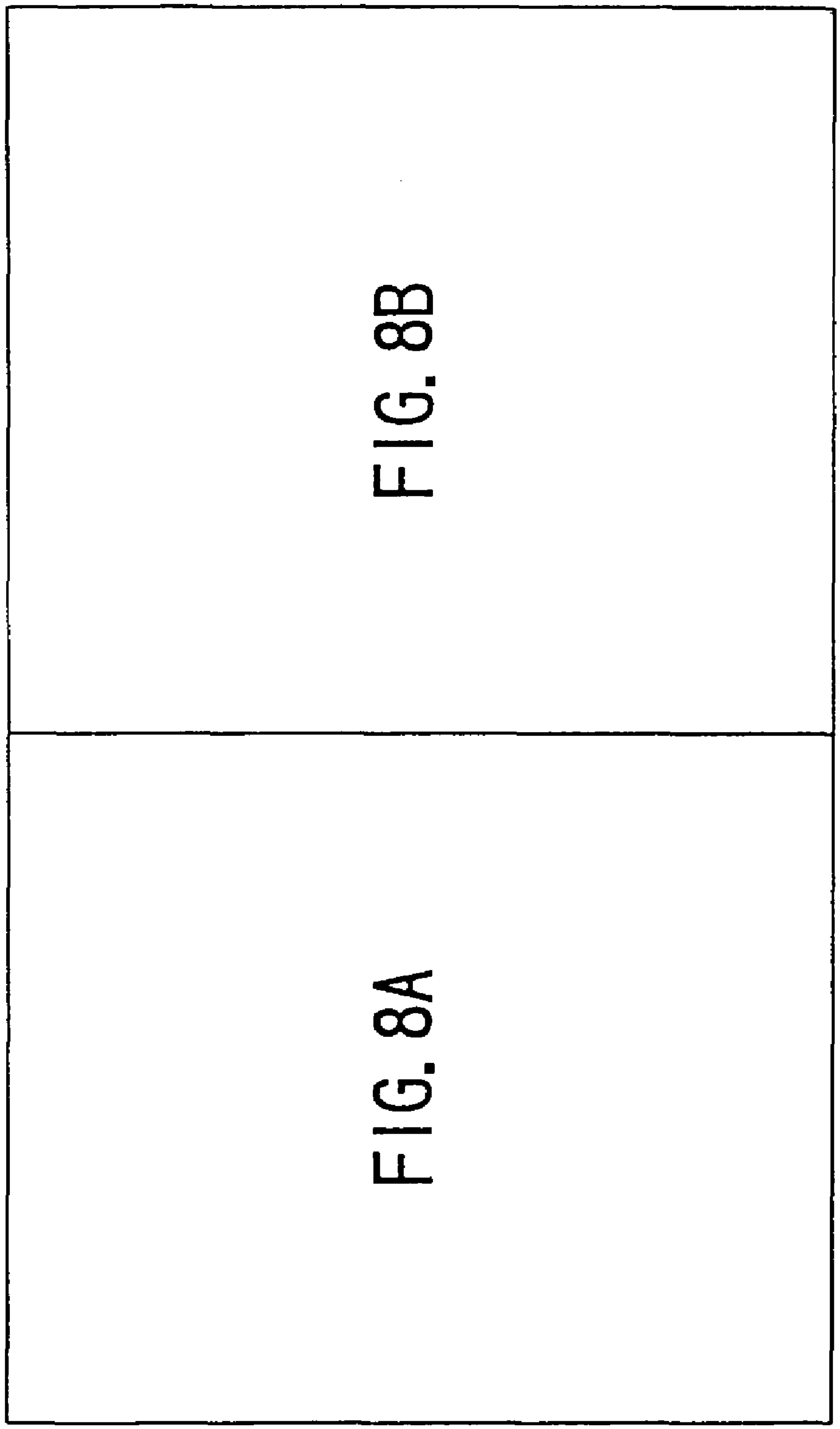
FIG. 8 illustrates a communication procedure in a case where a transmission source is in an external IP network.
Figure 8A:
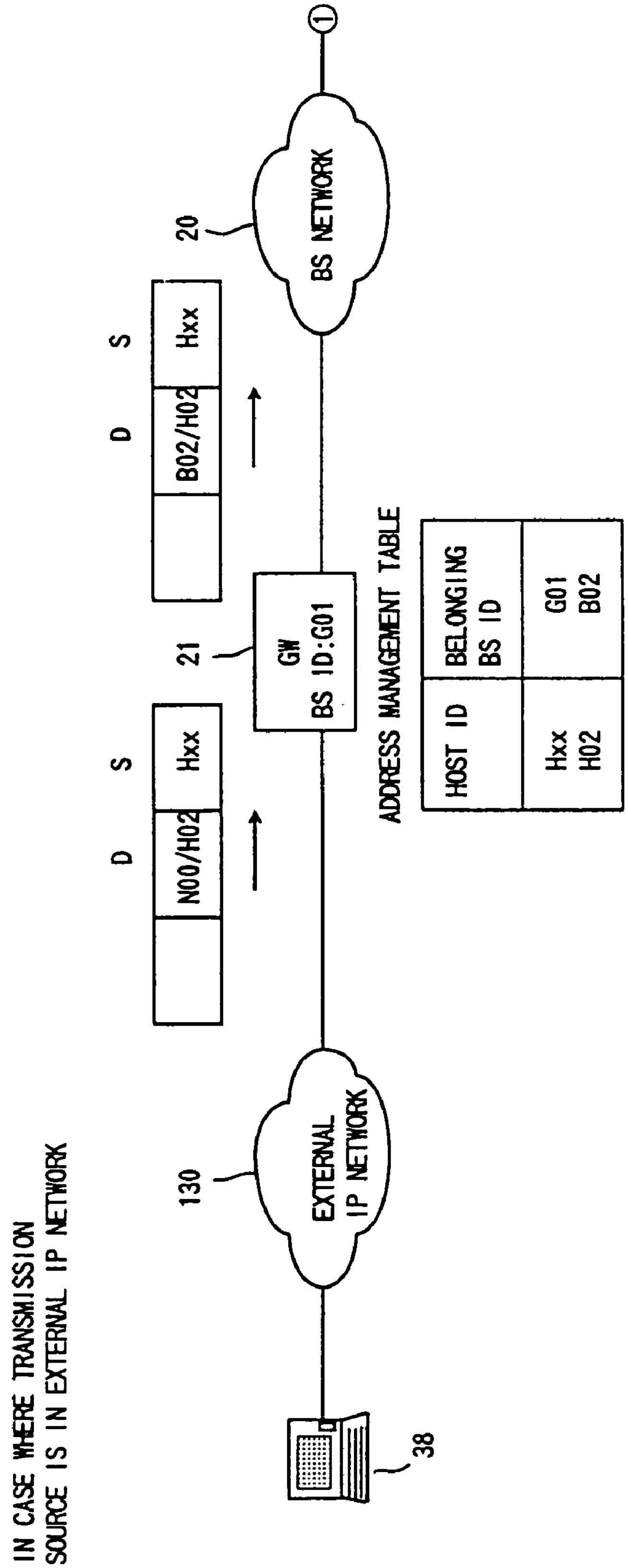
Figure 8B:
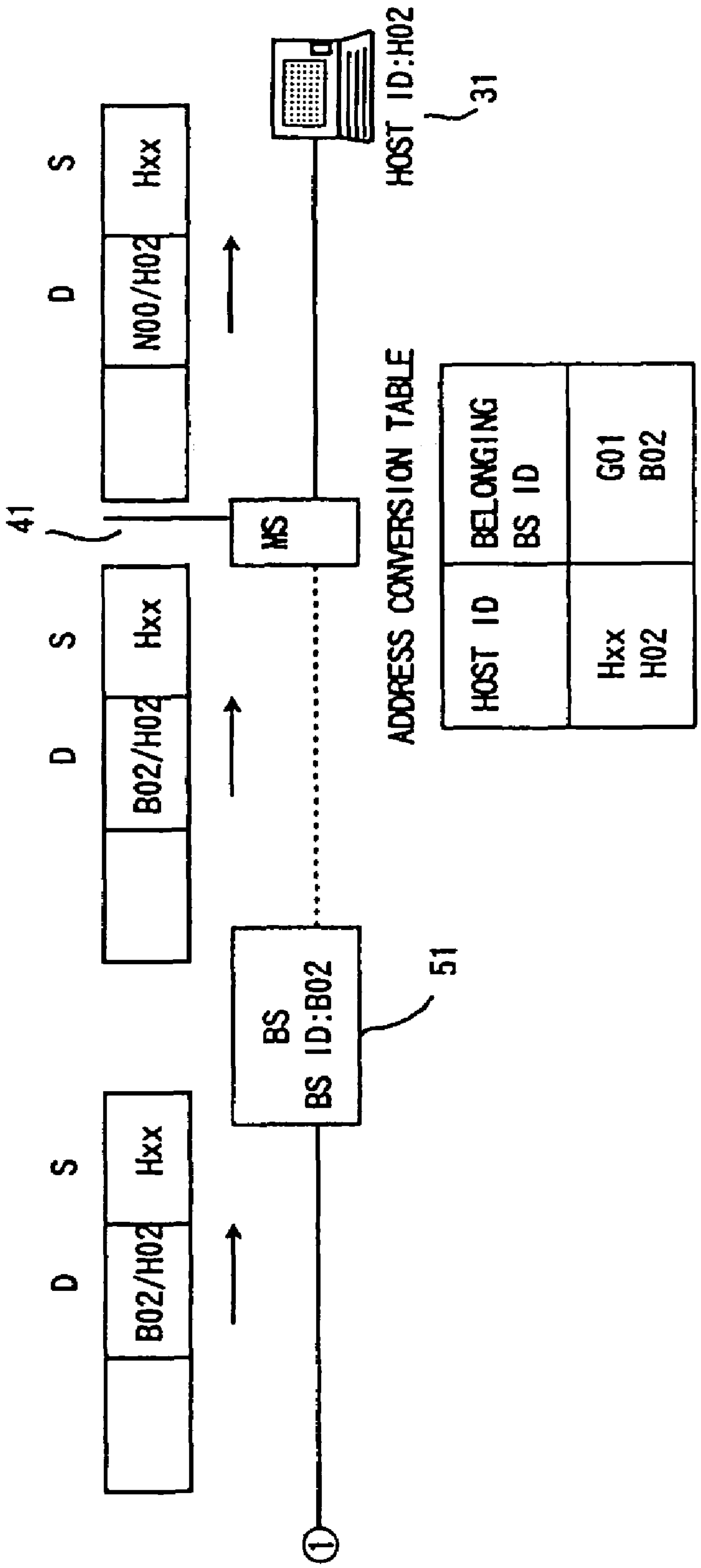

(2) A communication procedure in a case where a packet transferred from an external IP network 130 and addressed to the host 31 having the host ID of H02 is transferred to the host 31 (H02) connected to the mobile station 41 belonging to the base station 51 having the base station ID of B02 will now be described with reference FIG. 8.

① The packet transferred from the external IP network 130 has the base station ID field of the destination address thereof replaced with B02 and is transmitted to the base station network 20 by the gateway station 21 according to the address management table.

② The packet is transferred to the mobile station 41 belonging to the destination base station 51 (B02) via the base station 51. Then, the mobile station 41 replaces the base station ID field of the destination address with the fixed address N00, and transfers the packet to the host 31 (H02).

Operations performed by a base station will now be described.

(1) Operations in a case where a radio packet from a mobile station is received (i) When the base station ID in the transmission-source address of the packet coincides with the address of the own station, the base station transfers the packet as it is to another base station, mobile station, the address management server or the like according to path control or routing control.

(ii) When the base station ID in the transmission-source address of the packet does not coincide with the address of the own station, the base station replaces the base station ID with ID of the own station, and instructs the base station having the original ID to transfer a packet addressed to the transmission-source host of the above-mentioned packet to the current base station. Simultaneously, the base station instructs the address management server to update the address management table accordingly.

(2) Operations in a case where a packet from another base station or the like is received (i) When the base station ID of the destination address of the packet coincides with the address of the own station, and, also, no instructions of transfer has been given, the base station transmits the packet to the mobile station to which the destination host belongs.

(ii) When the base station ID of the destination address of the packet coincides with the address of the own station, and, also, instructions of transfer has been given, the base station replaces the base station ID of the packet with ID of the base station which is the destination of the thus-instructed transfer, and transfers the packet.

(iii) When the base station ID of the destination address of the packet does not coincide with the address of the own station, the base station transfers the packet to another base station according to path control or routing control.

Operations of a mobile station will now be described.

(1) The mobile station transfers a packet from a host to a base station. At this time, the mobile station replaces the base station ID field of the transmission-source address of the packet with ID of the base station to which the own station belongs, and replaces the base station ID field of the destination address with ID of the base station to which the mobile station to which the destination host is connected belongs.

When the ID of the base station to which the mobile station to which the destination host is connected belongs is not known, the mobile station replaces the base station ID field of the destination address with ID of the address management server.

(2) The mobile station transfers a packet from a base station to a host. At this time, the mobile station returns the base station ID field of each of the destination address and transmission-source address of the packet into the original fixed number (FIXED: fixed address).

(3) In order to achieve the above-mentioned operations of (1) and (2), the mobile station detects and stores the correspondences in ID between the transmission-source and destination hosts and the base stations to which the hosts belong, respectively, and performs address conversion according thereto.

The address management server in the above description manages the correspondence between each host ID and the base station ID of the base station to which the mobile station to which the host having the host ID is connected belongs. The address management server updates the management data each time the base station to which the mobile station belongs is updated.

Although the above description is one for the example of the mobile radio communication system, the present invention may also be applied to a fixed wire communication system.

Figure 9:
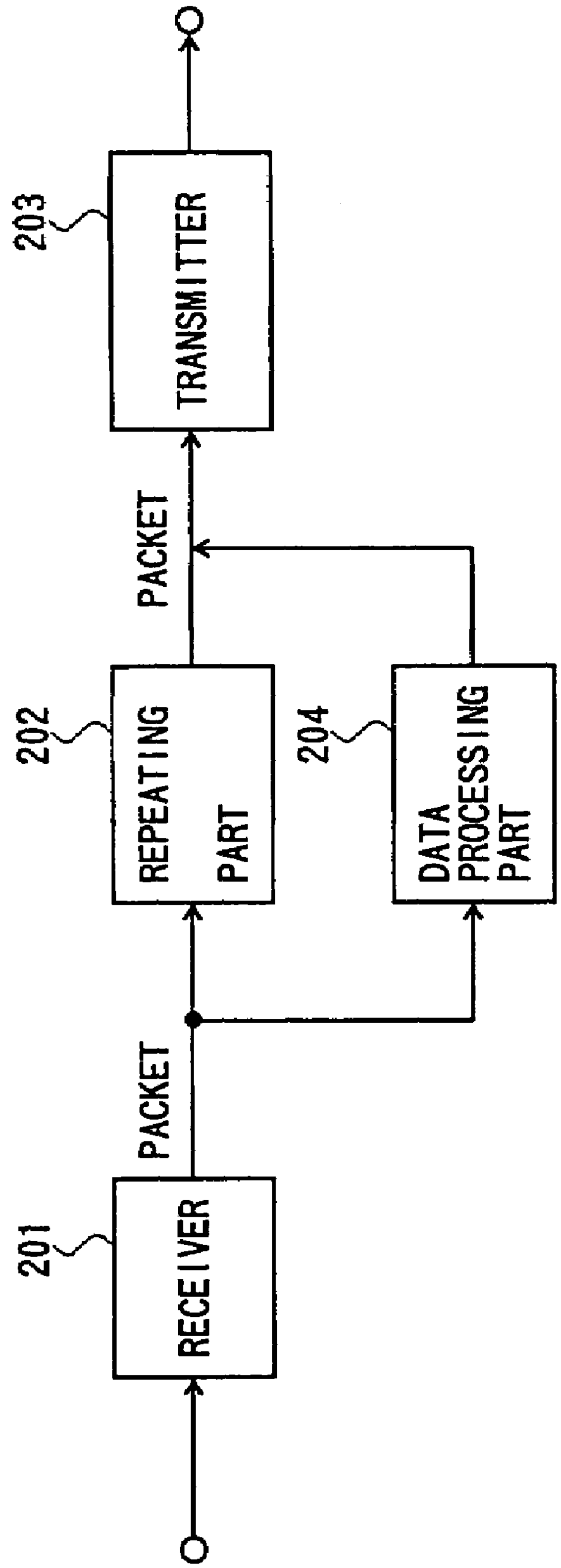
FIG. 9 shows a block diagram of each of mobile stations, base stations, address management station and gateway station shown in FIGS. 1, 3 through 8.

Each of the mobile stations, base stations, address management server and gateway station in the system described above according to the present invention may have a block configuration as shown in FIG. 9.

As shown in FIG. 9, each of the mobile stations, base stations, address management server and gateway station includes a receiver 201, a repeating part 202, a transmitter 203 and a data processing part 204. The receiver 201, repeating part 202 and transmitter 203 may be those well-known in the art employed by general repeaters used in a common communication networks. In a case of the gateway station, these parts further have functions of gateway well-known in the art used for linking two different types of networks, commonly.

The data processing part 204, which may include a CPU, a memory and other storage devices, as the need arises, performs the various operations of each of the mobile stations, base stations, address management server and gateway station described above with reference to FIGS. 2 through 8.

The present invention is not limited to the above-described embodiment, and variations and modifications may be made without departing from the scope of the present invention.

The present application is based on Japanese priority applications Nos. 11-371597 filed on Dec. 27, 1999, the entire contents of which are hereby incorporated by reference.

What is claimed is:

1. A packet communication method of communication employing a packet having a transmission-source address and a destination address, comprising the steps of:

a) making a predetermined number of bits of the transmission-source address and a predetermined number of bits of the destination address of the packet be predetermined address portions;

b) sending the packet from a transmission-source terminal to a source-side repeating node, and then converting at the source-side repeating node the predetermined address portion of the transmission-source address into an address of a higher-rank station for said a source-side repeating node; and c) said source-side repeating node converting the predetermined address portion of the destination address into an address of a higher-rank station of a last destination-side repeating node for a destination terminal, and transferring the packet.

2. The method as claimed in claim 1, wherein when the address of the higher-rank station of the last destination-side repeating node for the destination terminal is not known, the source-side repeating node, converts the predetermined address portion of the transmission-source address into an address of a node having a table that includes addresses for higher-rank stations for last repeating nodes of respective terminals, and transfers the packet.

3. The method as claimed in claim 2, wherein the node having the table converts its own address in the predetermined address portion of the destination address into the address of the higher-rank station of the last destination-side repeating node for a destination terminal, and then transfers the packet.

4. The method as claimed in claim 1, wherein:

the higher-rank station of the source-side repeating node transfers the packet without changing the predetermined address portion of the transmission-source address when the address of the higher-rank station in the predetermined address portion of the transmission-source address of the packet coincides with its own address, namely the address of the higher-rank station of the source-side repeating node, and when the address of the higher-rank station in the predetermined address portion of the transmission-source address of the received packet does not coincide with its own address, converts the address of the higher-rank station in the predetermined address portion of the transmission-source address into its own address, and then transfers the packet.

5. The method as claimed in claim 4, wherein when the address of the higher-rank station in the predetermined address portion of the transmission-source address does not coincide with its own address, the higher-rank station of the source-side repeating node further instructs the higher-rank station having the predetermined address portion of the transmission-source address originally written in the received packet to transfer a packet addressed to said transmission-source terminal to the higher-rank station of the source-side repeating node, and further instructs a node having a table of addresses of respective higher-rank stations of last repeating nodes for for respective terminals to update said table.

6. The method as claimed in claim 1, wherein:

when the address of the higher-rank station in the destination address coincides with its own address, and no transfer instructions are given for the destination terminal, the higher-rank station of the last destination-side repeating node for the destination terminal transfers the received packet without changing the destination address, and when the address of the higher-rank station in the destination address of the received packet coincides with its own address and transfer instructions are given for the destination terminal, the higher-rank station of the last destination-side repeating node converts the address of the higher-rank station of the destination address into an address of a higher-rank station of the destination as described in the transfer instructions, and then transfers the packet.

7. The method as claimed in claim 1, wherein:

when the address of the higher-rank station in the destination address of the received packet does not coincide with its own address, the higher-rank station of the last destination-side repeating node for the destination terminal transfers the packet.

8. The method as claimed in claim 1, wherein the last destination-side repeating node for the destination terminal converts addresses of the higher-rank stations in the transmission-source address and destination address of the received packet into the predetermined address portions, and transfers the packet to the destination terminal.

9. The method as claimed in claim 1, wherein, in a case where the destination terminal belongs to another network, the transmission-source terminal transmits the packet having an address given to the destination terminal as the destination address thereof;

the source-side repeating node converts the predetermined address portion of the transmission-source address of the received packet into the address of the higher-rank station of said source-side repeating node, and transfers the packet to a gateway station which provides an interface with the other network; and said gateway station converts the address of the higher-rank station of the received packet into the predetermined address, and transfers the packet into said other network.

10. The method as claimed in claim 1, wherein, in a case where the transmission-source terminal belongs to another network, said transmission-source terminal transmits the packet having an address given to the destination terminal as the destination address thereof; and a gateway station which provides an interface with said other network converts the predetermined address portion of the destination address of the received packet into the address of the higher-rank station of the last destination-side repeating node for said destination terminal, and then transfers the packet.

11. A node apparatus used in a packet communication system of communication employing a packet having a transmission-source address and a destination address, comprising:

a repeating part configured to repeat the packet from a transmission-source terminal, said packet having a predetermined number of bits of the transmission-source address and a predetermined number of bits of the destination address thereof made to be predetermined address portions;

an address converting part configured to convert the predetermined address portion of the transmission-source address into an address of a higher-rank station of said node apparatus, said address converting part further converting the predetermined address portion of the destination address into an address of a higher-rank station of a last destination-side repeating node for a destination terminal of the packet; and a transferring part configured to transfer the packet.

12. The node as claimed in claim 11, wherein:

when the address of the higher-rank station of the last destination-side repeating node for the destination terminal is not known, said address converting part is configured to convert the predetermined address portion of the transmission-source address into an address of a node having a table that includes addresses for higher-rank stations of last repeating nodes for respective terminals.

13. A node apparatus used in a packet communication system that employs a packet having a transmission-source address and a destination address, each with predetermined address portions, comprising:

an address converting part, which has a table of addresses of higher-rank stations of last repeating nodes for each respective terminal, and is configured to convert in said packet its own address in the predetermined address portion of the destination address of a received packet into an address of the higher-rank station of a last destination-side repeating node for a destination terminal; and a transferring part configured to transfer the packet.

14. A node apparatus used in a packet communication system that employs a packet having a transmission-source address and a destination address, each with predetermined address portions, comprising:

an address converting part configured to convert an address of a higher-rank station in the transmission-source address of a received packet into its own address when the address of the higher-rank station in the transmission-source address of the received packet does not coincide with its own address, before being transferred through a transferring part; and said transferring part configured to transfer the received packet without changing the transmission-source address through said address converting part when the address of the higher-rank station in the transmission-source address of the received packet coincides with its own address.

15. The node as claimed in claim 14, further comprising:

an instructing part configured to instruct a higher-rank station having the transmission-source address originally written in the received packet to transfer a packet addressed to said transmission-source terminal to node, when the address of the higher-rank station in the transmission-source address of the received packet does not coincide with the address of the node, and further instructing another node that has a table of addresses of a higher-rank stations of last repeating nodes for respective of each terminal to update said table accordingly.

16. A node apparatus used in a packet communication system that employs a packet having a transmission-source address and a destination address, each with predetermined address portions, comprising:

an address converting part configured to convert an address of a higher-rank station of a predetermined portion of a destination address into an address of a higher-rank station of another destination that is identified in an instructed transfer, when the address of the higher-rank station in the predetermined portion of the destination address coincides with its own address and transfer instructions are given for the destination terminal, before being transferred through a transferring part; and said transferring part configured to transfer the received packet without changing the destination address through the address converting part, when the address of the higher-rank station in the destination address coincides with its own address and no transfer instructions are given for the destination terminal.

17. A node apparatus used in a packet communication system that employs a packet having a transmission-source address and a destination address, each with predetermined address portions, comprising:

a determining part configured to determine whether an address of a higher-rank station in the destination address of a received packet does not coincide with an address of the node apparatus; and a transferring part configured to transfer the packet, when the address of the higher-rank station in the destination address of the received packet does not coincide with the address of the node apparatus as a result of the determination result of said determining part.

18. A node apparatus used in a packet communication system that employs a packet having a transmission-source address and a destination address, each with predetermined portions, comprising:

an address converting part configured to convert addresses of higher-rank stations in transmission-source address and destination address of a received packet into predetermined addresses; and a transferring part configured to transfer the packet to the destination terminal.

19. A node apparatus used in a packet communication system that employs a packet having a transmission-source address and a destination address, each with predetermined portions, said node providing an interface between different networks, comprising:

an address converting part configured to convert an address of a higher-rank station of a received packet into a predetermined address; and a transferring part configured to transfer the packet into another network.

20. A node apparatus used in a packet communication system that employs a packet having a transmission-source address and a destination address, said node providing an interface between different networks, comprising:

an address converting part configured to convert a predetermined address in the destination address of a received packet into an address of a higher-rank station of a destination side last repeating node for a destination terminal of the packet; and a transferring part configured to transfer the packet.

21. A packet communication system of communication employing a packet having a transmission-source address and a destination address, each with predetermined address portions, comprising:

a transmission-side terminal making a predetermined number of bits of the transmission-source address and a predetermined number of bits of the destination address of a packet to be the predetermined address portion; and a source-side repeating node, which repeats the packet from said transmission-source terminal, is configured to convert the predetermined address of the transmission-source address of the received packet into an address of a higher-rank station of said source-side repeating node, wherein said repeating node is configured to covert the predetermined address of the destination address of the received packet into an address of a higher-rank station of a last destination-side repeating node for a destination terminal, and transfer the packet.

22. The system as claimed in claim 21, wherein when the address of the higher-rank station of the last destination-side repeating node for the destination terminal is not known, said source-side repeating node, which repeats the packet from the transmission-source terminal, converts the predetermined address of the transmission-source address of the received packet into an address of a node having a table of addresses for a higher-rank stations of respective last repeating nodes for each terminal, and then transfers the packet.

23. The system as claimed in claim 22, wherein the node having the table converts its own address in the destination address of the received packet into the address of the higher-rank station of the last destination-side repeating node for a destination terminal, and then transfers the packet.

24. The system as claimed in claim 21, wherein:

the higher-rank station of the source-side repeating node, transfers the received packet without changing the transmission-source address when the address of the higher-rank station in the transmission-source address of the received packet coincides with its own address, and converts the address of the higher-rank station in the transmission-source address of the received packet into its own address when the address of the higher-rank station in the transmission-source address of the received packet does not coincide with its own address, and then transfers the packet.

25. The system as claimed in claim 24, wherein the higher-rank station of the source-side repeating node further instructs the higher-rank station having the transmission-source address originally written in the received packet to transfer a packet addressed to said transmission-source terminal to itself, when the address of the higher-rank station in the transmission-source address of the received packet does not coincide with its own address, and further instructs a node having a table of addresses of higher-rank station of respective last repeating nodes for each terminal so as to update said table.

26. The system as claimed in claim 21, wherein the higher-rank station of the destination-side last repeating node transfers the received packet without changing the destination address, when the address of the higher-rank station in the destination address coincides with its own address and no transfer instructions are given for the destination terminal, and converts the address of the higher-rank station of the destination address of the received packet into an address of a higher-rank station of a destination terminal identified in an instruction transfer, when the address of the higher-rank station in the destination address of the received packet coincides with its own address and transfer instructions are given for the destination terminal, and transfers the packet.

27. The system as claimed in claim 21, wherein the higher-rank station of the last destination-side repeating node for the destination terminal transfers the packet, when the address of the higher-rank station in the destination address of the received packet does not coincide with its own address.

28. The system as claimed in claim 21, wherein the last destination-side repeating node for the destination terminal converts the addresses of the higher-rank stations in the transmission-source address and destination address of the received packet into the predetermined addresses, and transfers the packet to the destination terminal.

29. The system as claimed in claim 21, wherein, in a case where the destination terminal belongs to another network, the transmission-source terminal transmits the packet having an address given to the destination terminal as the destination address thereof;

the repeating node, which repeats the packet from the transmission-source terminal first, converts the predetermined address in the transmission-source address of the received packet into the address of the higher-rank station of said repeating node, and transfers the packet to a gateway station which provides an interface with the other network; and said gateway station converts the address of the higher-rank station of the received packet into the predetermined address, and transfers the packet into said other network.

30. The system as claimed in claim 21, wherein, in a case where the transmission-source terminal belongs to another network, said transmission-source terminal transmits the packet having an address given to the destination terminal as the destination address thereof; and a gateway station which provides an interface with said other network converts the predetermined address in the destination address of the received packet into the address of the higher-rank station of the last repeating node for said destination terminal, and transfers the packet.

* * * * *